United States Patent
Verot et al.

(10) Patent No.: US 10,605,220 B2
(45) Date of Patent: Mar. 31, 2020

(54) MOTOR VEHICLE COMBUSTION ENGINE STARTER WITH AIR VENT OPENING

(71) Applicants: VALEO EQUIPMENTS ELECTRIQUES MOTEUR, Creteil (FR); JV SVES, Shanghai (CN)

(72) Inventors: Jacques Verot, Lyons (FR); Yongzhou Fan, Shanghai (CN)

(73) Assignee: Valeo Equipments Electriques Moteur, Creteil (FR)

(*) Notice: Subject to any disclaimer, the term of this patent is extended or adjusted under 35 U.S.C. 154(b) by 303 days.

(21) Appl. No.: 15/522,532

(22) PCT Filed: Oct. 27, 2015

(86) PCT No.: PCT/CN2015/092952
§ 371 (c)(1),
(2) Date: Apr. 27, 2017

(87) PCT Pub. No.: WO2016/066083
PCT Pub. Date: May 6, 2016

(65) Prior Publication Data
US 2017/0321647 A1 Nov. 9, 2017

(30) Foreign Application Priority Data
Oct. 27, 2014 (CN) .......................... 2014 1 0584867

(51) Int. Cl.
*F02N 15/06* (2006.01)
*F02N 15/04* (2006.01)
(Continued)

(52) U.S. Cl.
CPC ............ *F02N 15/067* (2013.01); *F02N 11/02* (2013.01); *F02N 11/0855* (2013.01);
(Continued)

(58) Field of Classification Search
CPC .... F02N 15/025; F02N 15/022; F02N 15/062; F02N 15/067; H02K 2205/09
(Continued)

(56) References Cited

U.S. PATENT DOCUMENTS 1,735,250 A * 11/1929 Jerdone, Jr. ............. F02N 15/08
74/7 R
1,757,238 A * 5/1930 Dyer ...................... F02N 15/067
74/6

(Continued)

FOREIGN PATENT DOCUMENTS

| CN | 1149104 A | 5/1997 |
| CN | 1641210 A | 7/2005 |

(Continued)

*Primary Examiner* — William C Joyce
*Assistant Examiner* — Randell J Krug
(74) *Attorney, Agent, or Firm* — Berenato & White, LLC

(57) ABSTRACT

The invention relates mainly to a starter (11) for a motor vehicle combustion engine, comprising:
  an electric motor (15),
  a drive pinion (60),
  a pinion body (61) on which said drive pinion (60) is mounted,
  a drive shaft (12) able to transmit a torque derived from the electric motor (15) to the drive pinion (60) via the pinion body, the pinion body (61) being mounted with the ability to slide axially with respect to the drive shaft (12),
  and in which, with there being a chamber (86) delimited notably by one end of the drive shaft (12) and one end of the pinion body (61) opposite the end of the drive shaft (12), the chamber (86) is vented via a through-opening (85) made in an annular wall of the drive shaft (12) or of the pinion body (61).

9 Claims, 3 Drawing Sheets

(51) Int. Cl.
*F02N 11/02* (2006.01)
*F02N 11/08* (2006.01)
*F02N 15/02* (2006.01)
*F02N 11/00* (2006.01)
*F02N 7/08* (2006.01)
*F16C 33/66* (2006.01)
*F16C 33/78* (2006.01)

(52) U.S. Cl.
CPC .......... *F02N 15/025* (2013.01); *F02N 15/04* (2013.01); *F02N 15/062* (2013.01); *F02N 7/08* (2013.01); *F02N 11/00* (2013.01); *F02N 15/022* (2013.01); *F16C 33/6618* (2013.01); *F16C 33/7886* (2013.01)

(58) Field of Classification Search
USPC .......................................................... 74/6, 7
See application file for complete search history.

(56) References Cited

U.S. PATENT DOCUMENTS

| | | |
|---|---|---|
| 4,855,610 A | 8/1989 | Morishita et al. |
| 5,014,563 A | 5/1991 | Isozumi |
| 5,101,114 A | 3/1992 | Isozumi et al. |
| 5,331,860 A * | 7/1994 | Demoule ............... F02N 15/00 403/DIG. 7 |
| 5,370,009 A * | 12/1994 | Isozumi ............... F02N 15/023 74/7 A |
| 5,806,366 A | 9/1998 | Vilou |
| 6,935,202 B2 * | 8/2005 | Siems ................... F02N 15/066 123/179.28 |
| 6,957,594 B2 * | 10/2005 | Yamada .................. F02N 15/06 384/294 |
| 7,373,908 B2 * | 5/2008 | Rizoulis ............... F02N 15/063 123/179.25 |
| 2006/0201266 A1 | 9/2006 | Kajino et al. |
| 2014/0245984 A1 | 9/2014 | Seillier et al. |
| 2015/0130309 A1 | 5/2015 | Gentil et al. |

FOREIGN PATENT DOCUMENTS

| | | |
|---|---|---|
| CN | 102686871 A | 9/2012 |
| CN | 103525164 A | 8/2013 |
| EP | 1298317 A1 | 4/2003 |
| FR | 2978500 A1 | 2/2013 |
| JP | H0286962 A | 3/1990 |
| JP | H10238441 A | 9/1998 |
| JP | H1182266 A | 3/1999 |
| WO | WO2013171432 A1 | 11/2013 |

* cited by examiner

MOTOR VEHICLE COMBUSTION ENGINE STARTER WITH AIR VENT OPENING

TECHNICAL FIELD

The present invention relates to a starter for a motor vehicle combustion engine, equipped with an air vent opening. The invention finds are particularly advantageous, although not exclusive, application in starters of vehicle combustion engine automatic stop and start systems.

BACKGROUND

In order to start a combustion engine, notably that of a motor vehicle, it is known practice to use a starter provided with a starter drive assembly capable of transmitting a rotational energy from the starter to a starter ring gear of a combustion engine. This starter drive assembly is mounted with the ability to slide on a driveshaft, which is coupled to the shaft of an electric motor via speed-reducing gearing.

The starter drive assembly is able to move between an active position in which a drive pinion meshes with the starter ring gear in order to start it following activation of the ignition, and a rest position in which the drive pinion is situated some distance away from the engine ring gear.

For that purpose, as may be seen in FIG. 1, the starter drive assembly 1 comprises the drive pinion 2 mounted to rotate as one with a pinion body 3, which is slidingly mounted on the drive shaft 5. The pinion body 3 is driven, via a freewheel device 8, via a driver 6 intended to be activated by a control lever 7.

The problem with such a configuration is that the variable-volume chamber 9 extending between one end of the drive shaft 5 and an end of the pinion body 3 opposite generates a retaining force as the starter drive assembly I moves, and this may cause problems with the meshing of the pinion 2 in the starter ring gear.

What happens, as the starter drive assembly 1 moves from the rest position into the active position, is that the increase in the volume of air contained in the chamber 9 as a result of the pinion body 3 moving further away with respect to the drive shaft 5 generates a suction effect. Moreover, as the starter drive assembly 1 moves from the active position into the rest position, the reduction in the volume of air contained in chamber 9 as a result of the pinion body 3 moving closer to the drive shaft 5, generates a resistive compression force. It should be noted that the generation of retaining forces is amplified by the fitting of bearing bushings 10 between the drive shaft 5 and the pinion body 3, as these are oiled and therefore cause the volume of air of the chamber 9 to be even better trapped with respect to the external atmosphere.

The system described in document EP1298317 allows the creation of a communication between the variable-volume chamber and a space situated near the freewheel device, by the creation of superficial grooves on an internal periphery of the pinion body. However, such a system requires the development of a complex tool in order to be able to create the pinion body by cold heading. Furthermore, the pinion body is mechanically weakened as a result of the creation of the grooves along its entire length.

SUMMARY

The invention seeks to provide an effective solution to these disadvantages by proposing a starter for a motor vehicle combustion engine, comprising:

an electric motor,
a drive pinion,
a pinion body on which the said drive pinion is mounted,
a drive shaft able to transmit a torque derived from the said electric motor to the said drive pinion via the said pinion body, the said pinion body being mounted with the ability to slide axially with respect to the said drive shaft, and in which, with there being a chamber delimited notably by one end of the said drive shaft and one end of the said pinion body opposite the end of the said drive shaft, the said chamber is vented via a through-opening made in an annular wall of the said drive shaft or of the said pinion body.

Which is meant by venting is that the chamber is placed in communication with the external atmosphere via the through-opening. Thus, as the starter drive assembly moves from one position to another, the invention makes it possible to avoid the generation of retaining forces liable to slow the movement of the drive pinion. Furthermore, the invention offers the advantage of being easy to implement, requiring only the creation of a simple hole after the pinion body has been machined, this hole having no adverse effect on the mechanical rigidity of the whole.

According to one embodiment, the said starter comprises at least one bearing bushing, mounted between the said pinion body and the said drive shaft, one end of the said through-opening between the end of the said pinion body delimiting the said chamber and the said bearing bushing.

That means that the opening can prevent the bearing bushing and the grease in contact with the pinion body and the drive shaft from retaining of the air of the chamber and therefore holding back the movement of the pinion through a suction cup or damper effect.

According to one embodiment, with the said pinion body surrounding the drive shaft, the said through-opening is made in an annular wall of the said pinion body.

According to one embodiment, with the said drive shaft surrounding the said pinion body, the said through-opening is made in an annular wall of the said drive shaft.

According to one embodiment, the said through-opening has a substantially radial orientation. That makes it possible to avoid the ingress of dirt under the effect of centrifugal force.

According to one embodiment, the said pinion body comprises a splined portion on which the said drive pinion is mounted so as to slide axially between a rest position and a tooth-against-tooth position.

According to one embodiment, the said through-opening opens into the said splined portion of the said pinion body.

According to one embodiment, the said through-opening opens under the said drive pinion when the said drive pinion is in the said rest position.

According to one embodiment, the said starter comprises an elastic return member for returning the said drive pinion to the rest position, the said drive pinion comprising a cavity accommodating one end of the said elastic return member, the said through-opening opening into the said cavity when the said drive pinion is in the rest position. This then prevents the edges of the opening, which may potentially be burred, from being able to impede the movement of the drive pinion along the pinion body between its two positions.

According to one embodiment, the said through-opening has a diameter of the order of 2 millimetres.

BRIEF DESCRIPTION OF THE DRAWINGS

The invention will be better understood from reading the description which follows and from examining the accompanying figures. These figures are giving only by way of entirely nonlimiting illustration of the invention.

DETAILED DESCRIPTION

In FIGS. 2 to 5, elements that are identical, similar or analogous retain the same reference from one figure to another.

Figure 1:
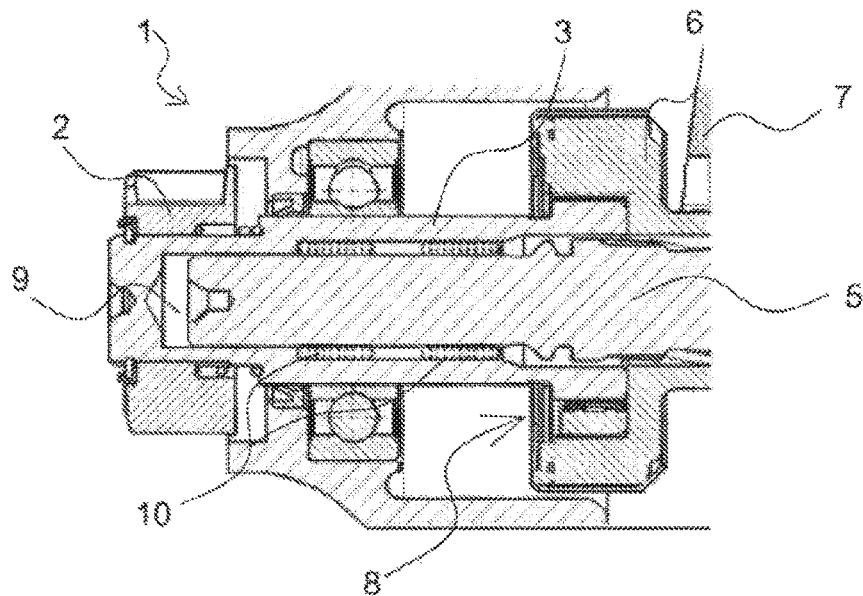
FIG. 1, already described, is a view of a longitudinal section of a starter drive assembly of a combustion engine starter according to the prior art.
Figure 2:
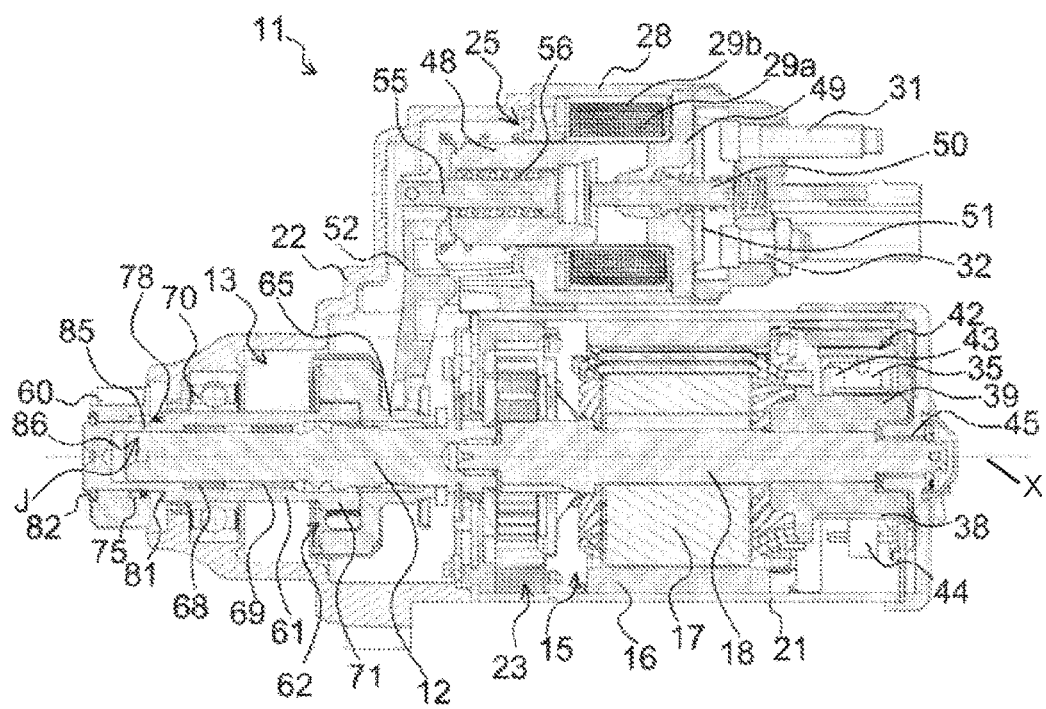
FIG. 2 is view m longitudinal section of the combustion engine starter according to the present invention.
Figure 3:
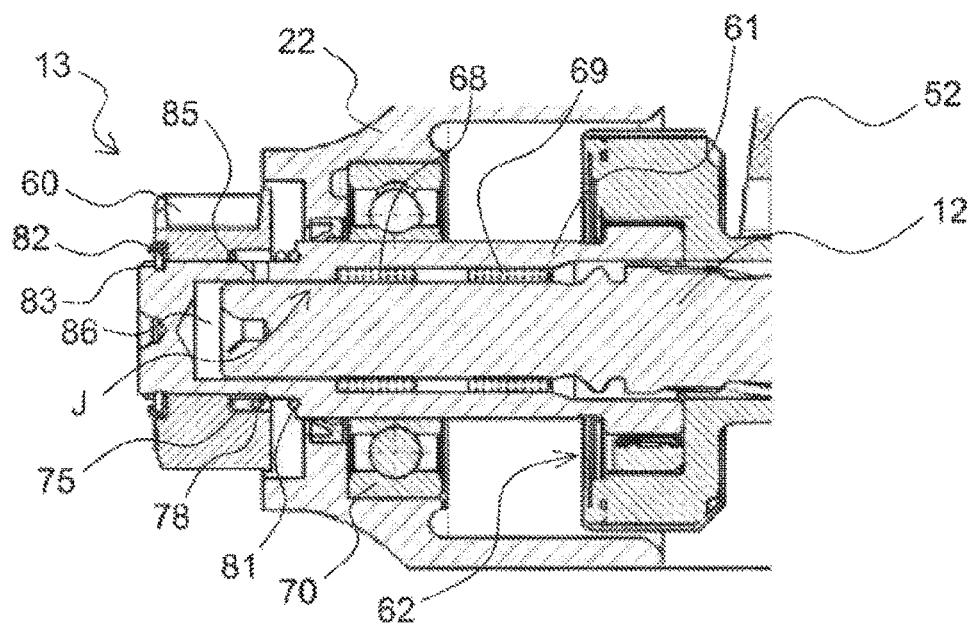
FIG. 3 depicts a detailed view in cross section of the starter drive assembly of the starter of FIG. 2.
Figure 4A:
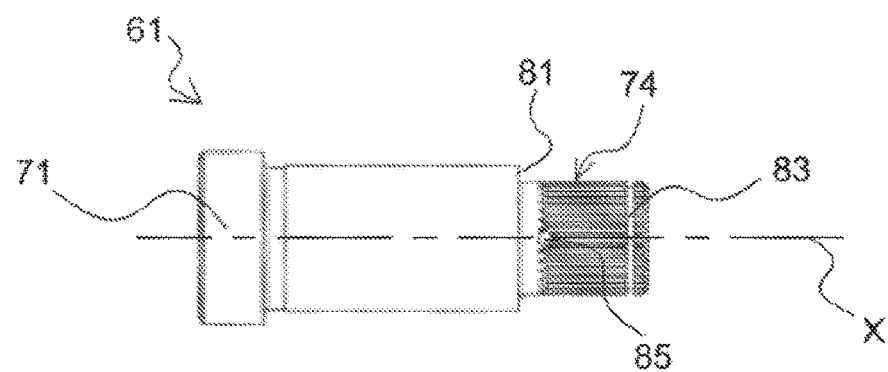
FIGS. 4a and 4b are respectively a side view and a view in longitudinal section of the pinion body of the starter drive assembly of FIG. 3.
Figure 4B:
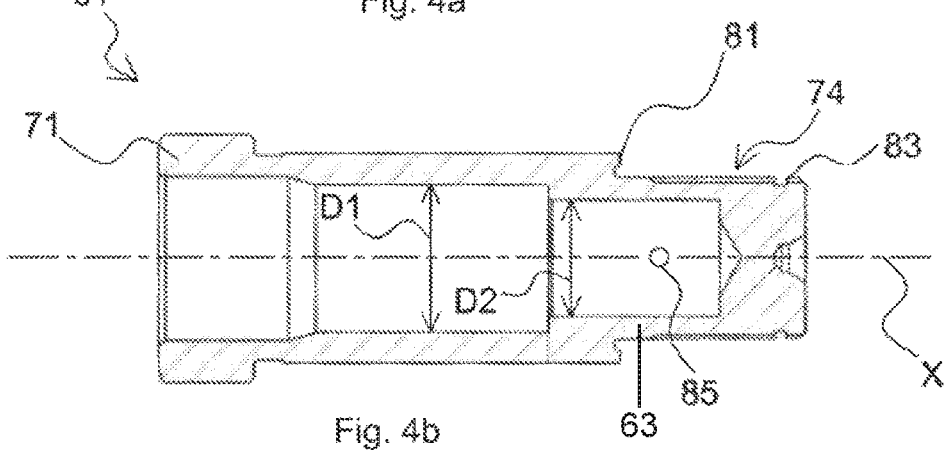
Figure 5:
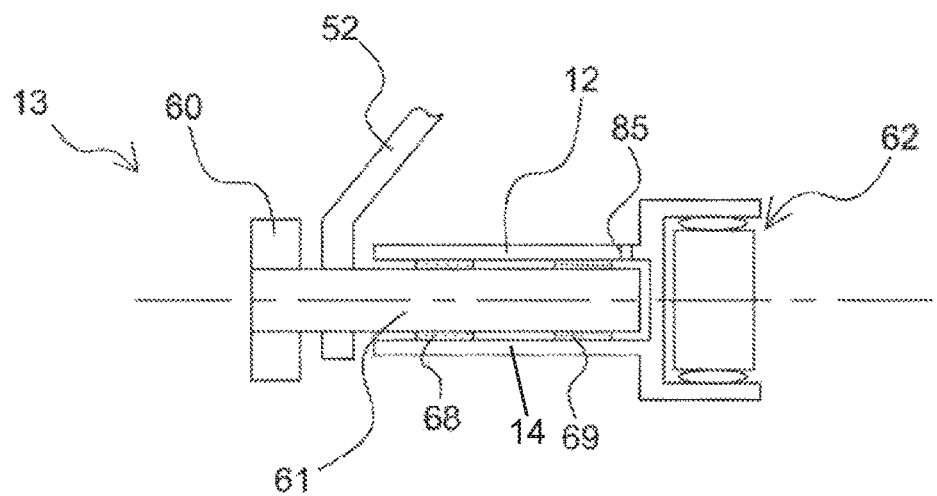
FIG. 5 is a schematic depiction in longitudinal section of a second embodiment of the starter drive assembly of the starter according to the present invention.

Moreover, an orientation from front to rear corresponding to an orientation from left to right in FIGS. 2, 3 and 5 is adopted.

With reference to FIG. 2, the starter 11 according to the invention notably comprises a drive shaft 12, a starter drive assembly 13 mounted on the drive shaft 12, and an electric motor 15 made of an inductor stator 16 and of an armature rotor 17 secured to a shaft 18. The motor 15 comprises a casing 21 mounted on a support 22 of the starter 11 intended to be fixed to a fixed part of the motor vehicle.

Speed-reducing gearing 23 of the epicyclic gearbox type is preferably imposed between a rear end of the drive shaft 12 and the shaft 18 of the electric motor 15.

The starter 11 also comprises an electromagnetic contact switch 25 running parallel to the electric motor 15 and installed radially above the latter. The contact switch 25 has a metal pan 28 equipped with a set of excitation coils 29a, 29b. Terminals 31, 32 are configured so that each forms a fixed contact inside the pan 28. One of the terminals, 31, is intended to be connected to the positive terminal of the vehicle battery, the other terminal 32 is connected to the input of the inductor coil of the stator 16 and to the brushes 35 of positive polarity.

These brushes 35 rub against conducting strips 38 of a slip-ring assembly 39 to power the rotor coils. The brushes 35 belong to a brush holder 42 equipped with cages 43 that guide and accommodate the brushes 35. These brushes 35 are urged towards the conducting strips 38 by elastic means 44 of the spring type. A rear endplate bearing 45 is used to mount one end of the shaft 18 of the electric motor 15 such that it can rotate.

In a known manner, when the in-rush coil 29a is energized, a moving core plunger 48 is attracted by magnetic attraction towards a fixed core plunger 49 of the contact switch 25 in order, on the one hand, after taking up play, to act on a rod 50 bearing a mobile contact 51 in order to close the contacts 31, 32 of the contact switch 25 and power the electric motor 15 and, on the other hand, to actuate a control lever 52 acting on the starter drive assembly 13. The upper end of the lever 52 is, in the known way, mounted in an articulated manner on a mobile rod 55 elastically connected to the mobile core plunger 48 via a spring 56, referred to as the tooth-against-tooth engagement spring, housed in the mobile core plunger 48.

The starter drive assembly 13 can thus move from a rest position in which a drive pinion 60 is situated some distance away from the starter ring gear of the combustion engine, into an active position in which the drive pinion 60 meshes with the starter ring gear of the combustion engine. The drive shaft 12 therefore transmits torque derived from the electric motor 15 to the drive pinion 60 via a pinion body 61 through a freewheel device 62. Following deactivation of the contact switch 25, the starter drive assembly 13 returns from its active position to its rest position.

More specifically, as may be seen in FIG. 3, the starter drive assembly 13 comprises the drive pinion 60 installed on the outside of the support 22, a pinion body 61, a driver 65 configured to be actuated by the control lever 52, and the freewheel device 62.

When the starter drive assembly 13 is in an active position, the pinion body 61 is driven, via the freewheel device 62, by the driver 65. This freewheel device 62 is, for example, of the type employing rollers, but as an alternative could be replaced by a conical clutch device or a clutch equipped with a number of friction discs, as described in document FR2978500.

In the known way, the driver 65 is provided internally with helical spline engaging in a complementary manner with external helical teeth borne by the drive shaft 12. The starter drive assembly 13 is thus given a helical movement as it is moved by the lever 52 to come into the active position, via the pinion 60, in mesh with the starter ring gear of the combustion engine.

The pinion body 61, which has a hollow tubular shaft shape closed at one of its ends, surrounds the drive shaft 12 which extends inside the hollow of the pinion body 61. This pinion body 61 is slideably mounted on the drive shaft 12.

For that, the pinion body 61 rests on the drive shaft 12 via two annular bearing bushings 68, 69. As an alternative, use is made of just one or of more than two bearing bushing(s). As is clearly visible in FIG. 4b, the part of the pinion body 61 that accommodates the two bearing bushings 68, 69 has an inside diameter D 1 greater than the inside diameter D2 of the part that accepts the front end of the drive shaft 12, which part has an internal diameter slightly greater than the outside diameter of the drive shaft 12 because of the assembly clearance J. Moreover, the pinion body 61 has a shoulder 71 at the rear part, the periphery of which shoulder constitutes an internal track for the roller type freewheel 62.

The pinion body 61 is mounted such that it can rotate in a front bearing 70 of the support 22. This bearing 70 consists by way of example of a rolling-contact ball bearing or, as an alternative, a rolling-contact needle bearing, or a plain bearing.

Furthermore, the pinion body 61 comprises a portion 74 which at its external periphery has axial splines (cf. FIGS. 4a and 4b) intended to collaborate with axial splines of corresponding shape made in an internal periphery of the drive pinion 60. The drive pinion 60 is thus connected to rotate as one with the pinion body 61 but is mounted with the ability to move translationally with respect to the pinion body 61 between a rest position and a tooth-against-tooth position.

The drive pinion 60 comprises a cavity 75 clearly visible in FIG. 3 and intended to accommodate an elastic return member 78, in this instance a spring. This spring 78 bears at one of its ends against the closed end of this cavity 75 consisting of a radially oriented annular wall connected to the internal periphery of the pinion 60. The other end of the spring 78 bears against a shoulder 81 of the pinion body 61. Furthermore, a circlip 82, which acts as an axial end stop, is mounted in a groove 83 machined in the front end of the pinion body 61.

In the rest position, the drive pinion 60 bears against the end stop 82 because of the axial action of the spring 78, whereas in the tooth-against-tooth position, the pinion 60 is away from the end stop 82 as a result of the contact between the pinion 60 and the teeth of the starter ring gear, which contact has a tendency to compress the spring 78. The spring 78 then makes it easier for the pinion 60 to return to its rest position.

Furthermore, a through-opening 85 that can be seen clearly in FIGS. 2, 3, 4a and 4b, is made in an axially oriented annular wall 63 of the pinion body 61 so as to radially extend through the axially oriented annular wall 63 of the pinion body 61. This through-opening 85 vents a variable-volume chamber 86. This chamber 86 is defined by part of the internal periphery of the pinion body 61 and extends between a front end of the drive shaft 12 and an end of the pinion body 61 opposite.

The through-opening 85 has a first end, referred to as the inlet, opening on the side of the chamber 86, and a second end, referred to as the outlet, opening on the side of the external atmosphere. The inlet of the through-opening 85 does not necessarily open exactly into the chamber 86 but may open into any space in communication with the chamber 86 allowing it to be vented, such as the space corresponding to the assembly clearance J between an external periphery of the drive shaft 12 and an internal periphery of the pinion body 61 (cf. FIGS. 2 and 3).

For preference, the inlet of the through-opening 85 is situated between the chamber 86 and the bearing bushing 68 closest to the drive pinion 60. Moreover, the through-opening 85 opens, via its outlet, into the splined portion 74.

Advantageously, the through-opening 85 is made under the drive pinion 60 when the latter is in the rest position. In this particular instance, the through-opening 85 has an outlet opening into the cavity 75 when the drive pinion 60 is in the rest position. This then prevents the edges of the opening 85, which may potentially be burred 9 from being able to impede the movement of the pinion 60 along the splines made in the pinion body 61.

For preference, the through-opening 85 has an orientation that is substantially radial with respect to a rotational axis X of the pinion body 61, so as to prevent the ingress of dirt under the effect of centrifugal force. However, as an alternative, this opening 85 could be slightly inclined with respect to the radial direction. The through-opening 85 has a diameter for example of the order of 2 millimetres.

When the contact switch 25 is activated, the movement of the starter drive assembly 13 from the rest position into the active position causes an increase in the volume of the chamber 86 as a result of the two respective ends of the drive shaft 12 and of the pinion body 61 that face one another moving further apart. The presence of the through-opening 85 placing the chamber 86 in communication with the external periphery makes it possible to avoid the generation of the suction cup effect liable to slow the movement of the drive pinion 60.

Moreover, when the contact switch 25 is deactivated, the movement of the starter drive assembly 13 from the active position to its rest position leads to a reduction in the volume of the chamber 86 as a result of the two respective ends of the drive shaft 12 and of the pinion body 61 facing one another moving closer together. The presence of the through-opening 85 placing the chamber 86 in communication with the external periphery makes it possible to avoid the generation of a compression effect liable to slow the movement of the drive pinion 60.

In the embodiment of FIG. 5, the drive shaft 12 has a hollow shape and surrounds the pinion body 61 that takes the form of a hollow shaft extending inside the hollow of the drive shaft 12. The drive shaft 12 then constitutes the element connected at output of the freewheel device 62 (rather than the pinion body 61 in the preceding figures). The pinion body 61 is mounted with the ability to slide axially with respect to the drive shaft 12. In this alternative form of embodiment, in order to place the chamber 86 in communication with the external atmosphere, the through-opening 85 is made in an axially oriented annular wall 14 of the drive shaft 12 so as to radially extend through the axially oriented annular wall 14 of the drive shaft 12.

Of course, the foregoing description has been given by way of example only and does not restrict the field of the invention from which the replacement of embodiment details by any other equivalent ones would not constitute departure.

The invention claimed is:

1. A starter (11) for a motor vehicle combustion engine, the starter comprising:
   an electric motor (15);
   a drive pinion (60);
   a pinion body (61) on which the drive pinion (60) is mounted, the pinion body (61) having a rotational axis (X);
   a drive shaft (12) configured to transmit a torque derived from the electric motor (15) to the drive pinion (60) via the pinion body, the pinion body (61) being mounted with the ability to slide axially with respect to the drive shaft (12); and
   a chamber (86) delimited by one end of the drive shaft (12) and one end of the pinion body (61) opposite the end of the drive shaft (12), the chamber (86) is vented via a through-opening (85) extending radially through an annular wall of the drive shaft (12) or of the pinion body (61) and having a radial orientation with respect to the rotational axis (X);
   the pinion body (61) comprising a splined portion (74) on which the drive pinion (60) is mounted so as to slide axially between a rest position and a tooth-against-tooth position;
   the through-opening (85) opens into the splined portion (74) of the pinion body (61).

2. A starter (11) for a motor vehicle combustion engine, the starter comprising:
   an electric motor (15);
   a drive pinion (60);
   a pinion body (61) on which the drive pinion (60) is mounted, the pinion body (61) having a rotational axis (X);
   an elastic return member (78);
   a drive shaft (12) configured to transmit a torque derived from the electric motor (15) to the drive pinion (60) via the pinion body, the pinion body (61) being mounted with the ability to slide axially with respect to the drive shaft (12); and
   a chamber (86) delimited by one end of the drive shaft (12) and one end of the pinion body (61) opposite the end of the drive shaft (12), the chamber (86) is vented via a through-opening (85) extending radially through an annular wall of the drive shaft (12) or of the pinion body (61) and having a radial orientation with respect to the rotational axis (X);
   the drive pinion (60) mounted to the pinion body (61) so as to slide axially between a rest position and a tooth-against-tooth position;

the through-opening (85) opens under the drive pinion (60) when the drive pinion (60) is in the rest position;

the elastic return member (78) configured for returning the drive pinion (60) to the rest position;

the drive pinion (60) comprising a cavity (75) accommodating one end of the elastic return member (78);

the through-opening (85) opens into the cavity (75) when the drive pinion (60) is in the rest position.

3. The starter according to claim 2, wherein the through-opening (85) has a diameter of 2 millimeters.

4. The starter according to claim 2, further comprising at least one bearing bushing (68, 69) mounted between the pinion body (61) and the drive shaft (12), wherein one end of the through-opening (85) opens between the end of the pinion body (61) delimiting the chamber (86) and the bearing bushing (68, 69).

5. The starter according to claim 4, wherein, with the pinion body (61) surrounding the drive shaft (12), the through-opening (85) is made in the annular wall (63) of the pinion body (61).

6. The starter according to claim 4, wherein the pinion body (61) comprises a splined portion (74) on which the drive pinion (60) is mounted so as to slide axially between a rest position and a tooth-against-tooth position.

7. The starter according to claim 2, wherein, with the pinion body (61) surrounding the drive shaft (12), the through-opening (85) is made in the annular wall (63) of the pinion body (61).

8. The starter according to claim 7, wherein the pinion body (61) comprises a splined portion (74) on which the drive pinion (60) is mounted so as to slide axially between a rest position and a tooth-against-tooth position.

9. The starter according to claim 7, wherein the pinion body (61) comprises a splined portion (74) on which the drive pinion (60) is mounted so as to slide axially between a rest position and a tooth-against-tooth position.

* * * * *